UNITED STATES PATENT OFFICE.

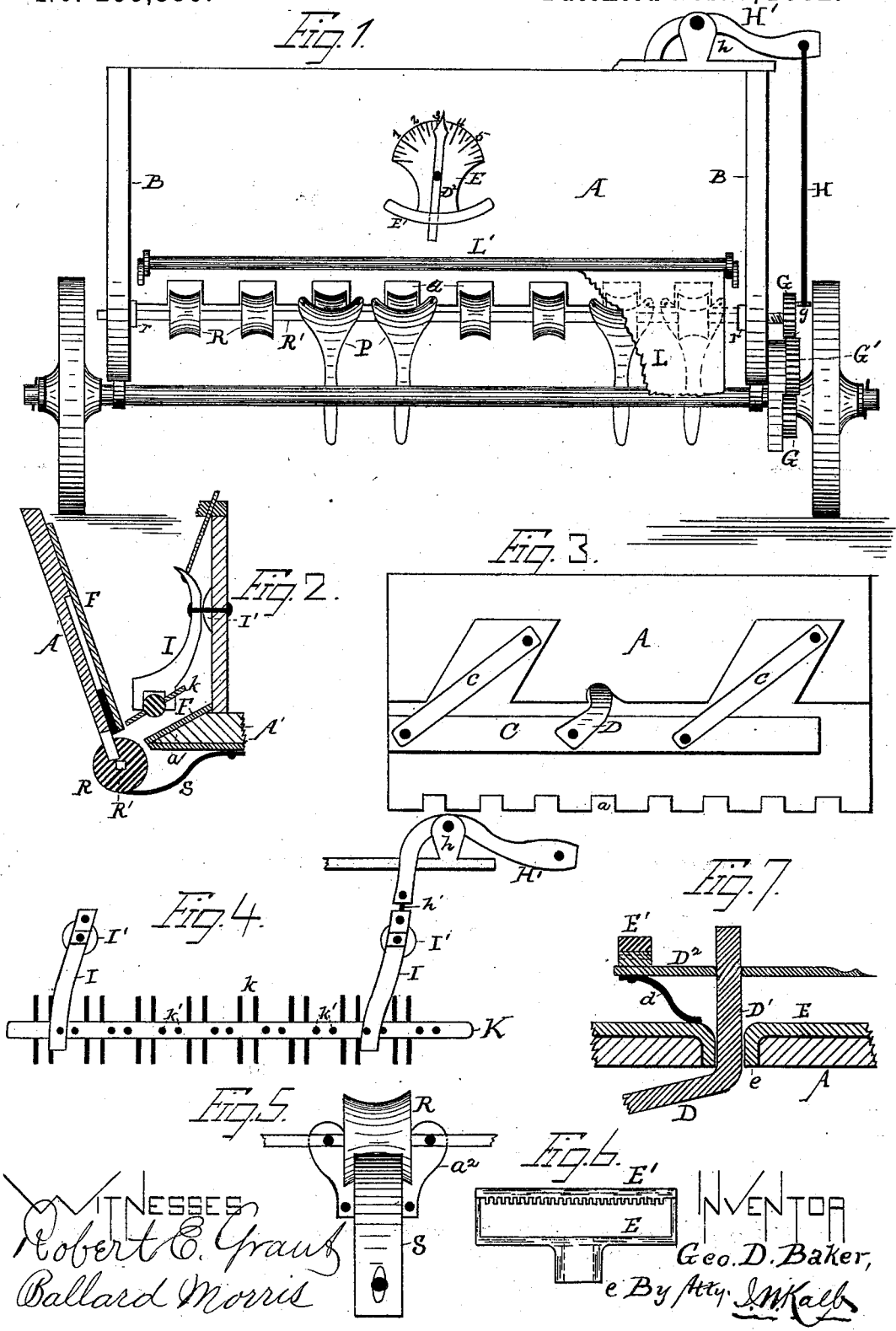

GEORGE D. BAKER, OF LOVETTSVILLE, ASSIGNOR OF ONE-HALF TO GEORGE WIRE, OF LOUDOUN COUNTY, VIRGINIA.

FERTILIZER-DISTRIBUTER FOR GRAIN-DRILLS.

SPECIFICATION forming part of Letters Patent No. 253,339, dated February 7, 1882.

Application filed September 17, 1881. (No model.)

*To all whom it may concern:*

Be it known that I, GEORGE D. BAKER, a citizen of the United States of America, residing at Lovettsville, in the county of Loudoun and State of Virginia, have invented certain new and useful Improvements in Fertilizer-Distributers for Grain-Drills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to fertilizer-distributers attached to grain-drills, and will be understood as set forth in the following specification and claims.

The fertilizer attachment is constructed with dish-shaped rollers receiving the guano at the corner of the guano-box, from holes through which the rollers slightly protrude, the guano comes from off a sloping bottom, and is fed down and kept in condition to feed by a stirrer operated with a to-and-fro movement. I mount the slide on swinging links, which have sufficiently tight connections with the back of the box and with the slide to prevent any unnecessary shaking or rattle. The slide is operated by a lever which is secured to it, and which extends through the back of the guano-box in the form of a shaft, and protrudes beyond the face of a dial, which is provided with a series of figures arranged on a scale to indicate the amount of fertilizer to be sown. Here the shaft is provided with a double spring-arm, which at once serves to indicate the amount of fertilizer being distributed, to fix and hold the shaft (and consequently the slide) in any desired position and regulate the feed of the fertilizer, and to afford a means for releasing and adjusting the slide. At one end it moves over the dial, and at the other it is provided with a spring, which normally keeps it engaged between the teeth of a fixed ratchet. The slide operated and controlled by the double spring-arm and lever has a positive diagonal cutting movement across the guano-outlets, and when properly worked will cut off and regulate the feed of the guano with absolute certainty. The slide, with the links by which it is swung, and the lever which operates it are let into the back of the guano-box, so that a zinc plate covering said box on back and bottom lies level with the inner surface of the box all around. This zinc plate is intended to prevent the vitriol and other corrosive substances found so frequently in fertilizers from coming in contact with and destroying the wood.

In the accompanying drawings, which form a part of this specification, and illustrate what I consider the best application of the invention, Figure 1 is a rear elevation. Fig. 2 is a transverse section. Fig. 3 is an elevation of the feed-slide and back of the guano-box. Fig. 4 is a view of the stirrer. Fig. 5 is a detail of the roller and scraper. Figs. 6 and 7 are details of the indicating and adjusting device.

Similar letters of reference indicate corresponding parts in all the views.

A is the back of the guano-box, and B B' the ends. A' is the bottom of the guano-box, which slopes backward at the proper angle, as shown in Fig. 2. At the corner where the bottom A' joins the back A a series of openings are cut, as marked at $a$. At these openings the bottom A' is cut out from beneath and forms the feather-edge $a'$. The rollers R, as hereinafter explained, revolve in the openings $a$. The back A is suitably cut out to receive the slide C and its links $c\ c$ and operating-lever D, by means of which connections the slide is worked up and down with a positive diagonal cutting movement, and is caused to increase or diminish the extent of the openings $a$, and thus regulate the feed of the guano. The lever D extends out through the back of the box in the form of a shaft, D'.

The dial E, with its fixed ratchet E', extends through the back of the guano-box from the exterior in the bearing $e$ for the shaft D. The dial is fastened to the back with screws. An arm, $D^2$, is properly secured on the shaft D', and serves as an index-hand for the dial at one end, while at the other it is provided with a spring, $d$, which keeps it continually forced out into engagement with the teeth on the ratchet E'. The dial is graduated on in the upper arc of its circumference. Here it indicates five general marks, which are numbered from 1 to 5, successively, and represent the number of hundred-weight of fertilizer the apparatus will distribute to the acre.

The relative arrangement of the slide C with reference to the holes $a$ and proper adjustment of the arm $D^2$ must all be carefully determined and accurately fixed in order that certain predetermined work be done. The spaces between the divisions 1 and 2, and 2 and 3, &c., are divided into quarters and halves or less fractions, so that the arm can be set at any one of them and indicate the amount of fertilizer being sown. The teeth in the ratchet E', or, more accurately speaking, the spaces between them, correspond with the marks of graduation on the arc of the dial, and the spring under the arm $D^2$ will force it into engagement wherever it is stopped, and hold it securely until a force is applied to the free end of the arm to overcome the spring.

A zinc plate, F, with holes corresponding to the exits $a$ in the box, covers the back and bottom of the interior of the guano-box, and is fitted with precision and delicacy about the openings $a$. The plate F covers the slide C and its connected links and lever; but these have free movement by reason of their being let into back A. The openings $a$ are at their exterior, along the bottom A', provided with boxes $a^2$, which are screwed to the bottom A', and are of such form as to preserve the feather-edge $a'$ of the bottom at this point, and these boxes, in conjunction with the zinc plate F, fitted about the interior of the openings, entirely cover up the wood.

The rollers R, as before alluded to, revolve in the openings $a$ and fit neatly between the sides of the boxes $a^2$. They protrude slightly above the level of the bottom A', and are dish-shaped or slightly concave on their peripheral face. They may be fitted with a feather to secure firm operation to the shaft R'. They receive the guano on their upper faces at the openings $a$ and carry it back and deliver it in the spouts P, which convey it on to be mixed and sown with the grain. The rollers are equipped with the spring-scrapers S, which fit into the dish-shaped circumference and remove any guano or substance that may have stuck to the rollers.

The shaft R' is provided with tightening-nuts $r$ where it passes through the ends B B' to take up the end-shake. At one end, beyond or outside of the part B', it is fitted with a pinion, G, which is screwed on the shaft in the direction of its motion, and abuts against a stop on the shaft R', when it is rotated by the action of the gear G', connected with the pinion $G^2$ on the axle of the machine. This gear can be thrown in or out of connection with the pinion G, and is preferably done in conjunction with the mechanism that cuts off the feed of grain in an ordinary drill, so that both the feed of grain and of guano will be checked at the same time.

The pinion G bears a pin, $g$, at a certain distance between the center and circumference, which connects with a pitman-rod, H, which reaches up and engages with an extended arm of the bell-crank lever H', which is pivoted in lugs $h$, and, passing through a hole in the cover of the drill, is connected by a link, $h'$, to the lever I of the stirrer. The lever I is pivoted to a metallic bearing, I', which bears a bold swell on the front, and is attached to the partition J of the drill-box. This partition slides in grooves at the ends of the box, and is removable. The lever I is forked at its lower end and receives the stirrer-rod K between its prongs, and is pivoted thereto. A lever, I, is also provided at the other end of the box, pivoted at its bifurcated end to the stirrer-rod and near its upper end to the bearing I'; but it has no bell-crank connection. The stirrer-bar is provided with two pins, $k\ k$, which reach down in the corners of the box and move over the openings $a$. Two of these pins are provided at each opening. Two pins, $k'$, between each of these pairs run in a little different direction and work the guano down from the other part of the box. As the pinion G is rotated it works the bell-crank H', which moves the stirrer-rod K backward and forward, through the medium of the link $h'$ and lever L.

An apron or awning, L, is attached to a roller, L', like an ordinary spring curtain-roller, which has its bearings attached to the rear of the drill. When the guano being sown is light and dry it will be blown away and wasted on windy days, and this apron L is then drawn down over the openings of the spouts P and prevents this waste.

The rollers R are made of glass, preferably, or some other non-corrodible material, in order to prevent and counteract the action of the vitriol, salt, and other corrosive and deleterious substances found in guano and fertilizers.

The spring-scrapers S are provided with a slot where they are attached to the bottom of the drill. A set-screw secures them in place and allows their being adjusted to bear with greater or less force on the rollers. They may be let in under the boxes $a^2$, and the set-screws will pass through both them and the boxes.

The lugs $h$ are formed in one piece with a cast seat, which is fitted on the top of the drill, with a hole cut through it.

Modifications may be made in many of the details.

The form of stirrer and the way of operating it can be varied within wide limits. The form shown and the means for operating it are adopted generally because they meet the needs of the case.

The shape of the fertilizer-box may be varied. It is preferably made with a sloping back at about the angle shown.

Having thus described my invention, I desire to claim and secure by Letters Patent—

1. The rollers R, having concave peripheral faces, in combination with the guano-box A, having the openings $a$ in the lower rear corner, said rollers being mounted on a shaft outside of said corner, and extending flush with or a little beyond the inner line of the box, substantially as set forth.

2. The combination of the slide C, links $c\ c$, and operating-lever D, shaft D′, hand-lever D², and spring $d$, forcing one end of the lever D² outward, with the ratchet E′ mounted outside of the lever D², the latter being adapted to be released from the ratchet by pressing down the spring end of it, as set forth.

3. The dial E, formed into the journal-box $e$, and having the ratchet E′ formed on the under side of an elevated portion, in combination with the lever D², shaft D′, and with the spring $d$, forcing the lever D² into engagement with the ratchet, as set forth.

4. The guano-box described, cut away in the back to receive the slide and its operating-links, and having a sloping bottom formed on the wood, and a feather-edge, $a'$, at the point where the rollers revolve, and having the lining F, covering the entire interior of the box, lying over the slide and attachments, and also having the openings $a$ in the rear corner provided with the metal boxes $a^2$, forming with the lining F a complete metal cover for the port $a'$, substantially as set forth.

In testimony whereof I affix my signature in presence of two witnesses.

GEORGE D. BAKER.

Witnesses:
    GEORGE WIRE,
    BENJ. L. REX.